United States Patent
Simitsis et al.

(10) Patent No.: US 9,613,083 B2
(45) Date of Patent: Apr. 4, 2017

(54) NESTING LEVEL

(75) Inventors: Alkiviadis Simitsis, Santa Clara, CA (US); William K. Wilkinson, San Mateo, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 941 days.

(21) Appl. No.: 13/457,093

(22) Filed: Apr. 26, 2012

(65) Prior Publication Data

US 2013/0290296 A1 Oct. 31, 2013

(51) Int. Cl.
G06F 17/30 (2006.01)

(52) U.S. Cl.
CPC .. G06F 17/30386 (2013.01); G06F 17/30501 (2013.01); G06F 17/30958 (2013.01)

(58) Field of Classification Search
CPC ................................................ G06F 17/30501
USPC ......................................................... 707/716
See application file for complete search history.

(56) References Cited

U.S. PATENT DOCUMENTS

| | | | |
|---|---|---|---|
| 5,701,461 A * | 12/1997 | Dalal et al. | |
| 6,751,792 B1 | 6/2004 | Nair | |
| 7,433,863 B2 | 10/2008 | Zane et al. | |
| 7,979,852 B2 | 7/2011 | Bodin et al. | |
| 8,091,071 B2 | 1/2012 | Tsantilis | |
| 8,156,481 B1 | 4/2012 | Koh et al. | |
| 2005/0055338 A1* | 3/2005 | Warner et al. | 707/3 |
| 2006/0047794 A1* | 3/2006 | Jezierski | 709/221 |
| 2006/0190460 A1* | 8/2006 | Chandrasekaran et al. | 707/100 |
| 2007/0168934 A1 | 7/2007 | Chandrasekharan et al. | |
| 2007/0214111 A1 | 9/2007 | Jin et al. | |
| 2012/0191698 A1* | 7/2012 | Albrecht et al. | 707/718 |

* cited by examiner

*Primary Examiner* — Grace Park
(74) *Attorney, Agent, or Firm* — Trop, Pruner & Hu, P.C.

(57) ABSTRACT

A system, method, and non-transitory computer readable medium are provided to access a graph comprising a plurality of nodes and at least one edge. Each node is associated with at least one database operation. Computer code is constructed that corresponds to the graph in accordance with a nesting level. The nesting level represents a degree of temporary storage to be allocated for intermediate output produced by the at least one database operation.

16 Claims, 4 Drawing Sheets

200

ACCESS A GRAPH ASSOCIATED WITH
AT LEAST ONE DATABASE OPERATION
202

DETERMINE NESTING LEVEL
204

CONSTRUCT CODE IN ACCORDANCE
WITH NESTING LEVEL
206

*Fig. 2*

NESTING LEVEL

BACKGROUND

A declarative database query language, such as structured query language ("SQL"), instructs a database management system ("DBMS") to retrieve certain rows and columns of data. Data may also be retrieved from other sources (e.g., flat file, XML file, etc.) using other programming languages. Code generators may be used to analyze high-level execution plans and produce computer code corresponding thereto. For example, if SQL is produced, the SQL may be executed by a runtime engine of a DBMS. Such code generators are useful in environments where the need for long or computationally complex query code arises frequently.

In an SQL environment, one approach to generating large database queries uses inner queries, otherwise known as "nested queries," within the main query. Such approach may also be implemented in other computer language environments using nested functions. In SQL, nested queries produce intermediate output that is further accessed by the larger query confining them. The advantages of using nested queries include their speed. Nested queries are almost exclusively executed in memory and a DBMS is typically equipped with a query optimizer. In another approach, intermediate output is stored in temporary storage from which it is later extracted from subsequent queries. A temporary storage approach may require creating, querying and then dropping a storage table. While this approach is inherently slower, temporary tables have some advantages over nested queries. Temporary tables may be preferred for fault-recovery or debugging purposes, since the tables retain a snapshot of intermediate output produced at several stages of the entire query.

BRIEF DESCRIPTION OF THE DRAWINGS

FIG. 2 is a flow diagram of an illustrative method in accordance with aspects of the disclosure herein.

DETAILED DESCRIPTION

As noted above, code generators may be utilized to automate the generation of computer code that obtain data. However, users are incapable of controlling the design of the resulting computer code. As such, environments that may benefit from one approach (e.g., nested query approach) over the other (e.g., temporary table approach) may be bound to whatever a code generator is programmed to implement. For example, a real-time stock trading system, in which speed is critical for its performance, may benefit from using nesting queries. In other environments, speed may not be as critical as having a record of intermediate output produced by the query. Furthermore, the needs of a particular environment may change overtime.

In view of the foregoing, various examples disclosed herein provide a system, method, and non-transitory computer readable medium to access a graph comprising a plurality of nodes and at least one edge. Each node may be associated with at least one database operation or with data. In another aspect of the present disclosure, a nesting level associated with the graph may be determined. The nesting level may represent a degree of temporary storage to be allocated for intermediate output produced by the at least one database operation. In a further aspect of the disclosure, computer code may be constructed that corresponds to the graph in accordance with the nesting level.

The techniques disclosed herein allow users to specify the degree of nesting in the computer code produced by a code generator. This allows users to adapt the computer code to the needs of their particular environment even as requirements change overtime. The aspects, features and advantages of the application will be appreciated when considered with reference to the following description of examples and accompanying figures. The following description does not limit the application; rather, the scope of the application is defined by the appended claims and equivalents.

Figure 1:
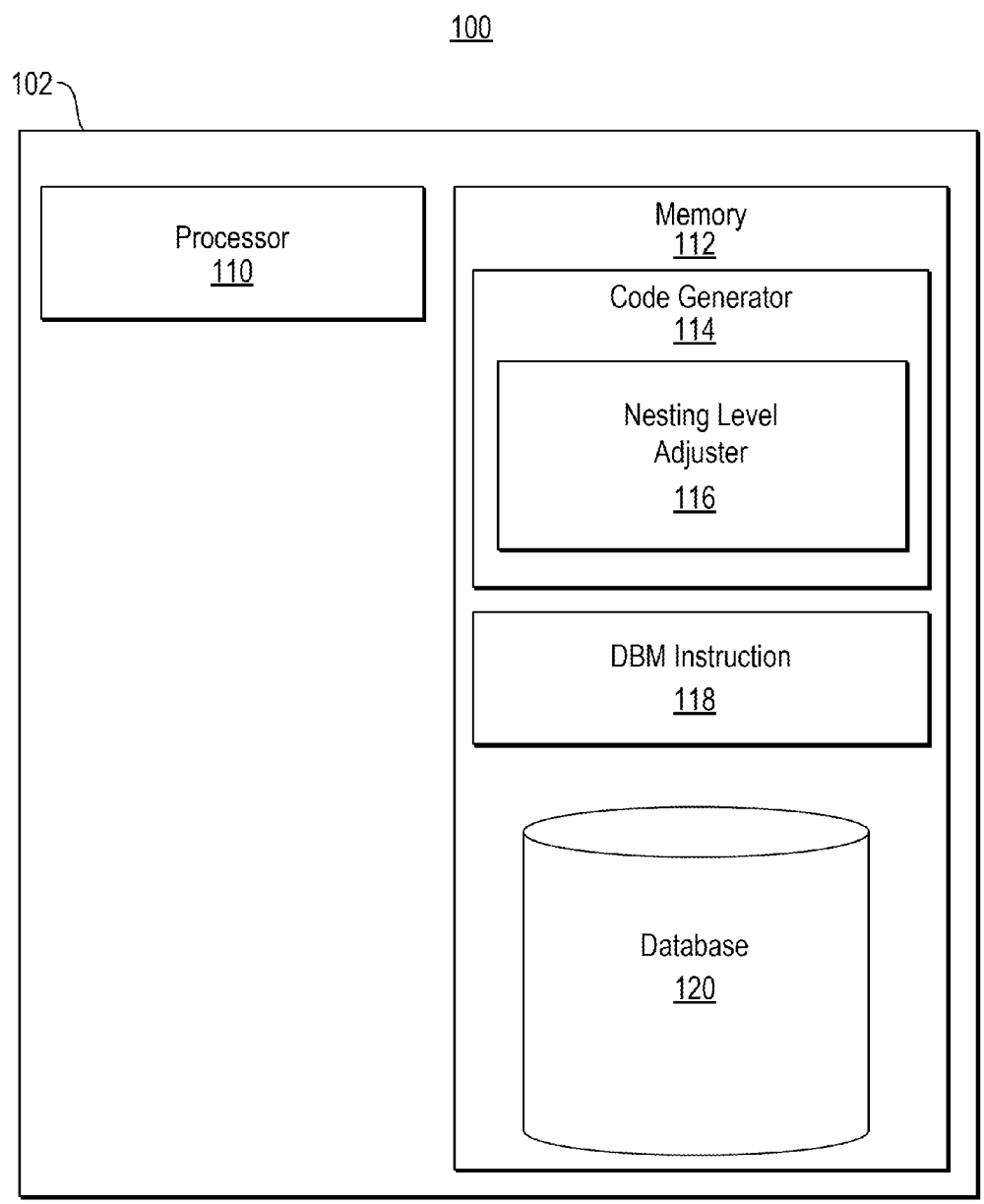
FIG. 1 is an illustrative system in accordance with aspects of the disclosure herein.

FIG. 1 presents a schematic diagram of an illustrative system 100 depicting a computer 102 that may comprise any device capable of processing instructions and transmitting data to and from other computers, including a laptop, a full-sized personal computer, a high-end server, or a network computer lacking local storage capability. Moreover, computer 102 may comprise a mobile device capable of wirelessly exchanging data with a server, such as a wireless-enabled PDA, or a tablet PC. Computer 102 may include all the components normally used in connection with a computer. For example, the computer may have a keyboard, a mouse and/or various other types of input devices such as pen-inputs, joysticks, buttons, touch screens, etc., as well as a display, which could include, for instance, a CRT, LCD, plasma screen monitor, TV, projector, etc.

Computer 102 may communicate with other computers via a network, which may be a local area network ("LAN"), wide area network ("WAN"), the Internet, etc. Computer 102 may use various protocols to communicate with other computers over the network. Such protocols may include virtual private networks, local Ethernet networks, private networks using communication protocols proprietary to one or more companies, cellular and wireless networks, instant messaging, HTTP and SMTP, and various combinations of the foregoing.

Computer 102 may be equipped with a processor 110 and memory 112. Memory 112 may store database management ("DBM") instructions 118 and code generator instructions 114 ("code generator 114"), each of which may be retrieved and executed by processor 110. Furthermore, memory 112 may contain a database 120, which may be retrieved, manipulated, or stored by processor 110. In one example, memory 112 may be a random access memory ("RAM") device. Alternatively, memory 112 may comprise other types of devices, such as memory provided on floppy disk drives, tapes, and hard disk drives, or other storage devices that may be directly or indirectly coupled to computer 102. The memory may also include any combination of one or more of the foregoing and/or other devices as well. The processor 110 may be any number of well known processors, such as processors from Intel® Corporation. In another example, processor 110 may be a dedicated controller for executing operations, such as an application specific integrated circuit ("ASIC").

Although the architecture of database 120 is not limited to any particular database structure or product, the data thereof may be stored in computer registers, in a relational database as tables having a plurality of different columns and records, XML documents or flat files. As such, the term "database operation," as used herein, may include reading and writing to and from flat files or XML files. The data stored in database 120 may comprise any information sufficient to identify the relevant data, such as numbers, descriptive text, proprietary codes, references to data stored in other areas of the same memory or different memories (including other network locations) or information that is used by a function to calculate the relevant data.

Although FIG. 1 functionally illustrates the processor 110 and memory 112 as being within the same block, it will be understood that the processor and memory may actually comprise multiple processors and memories that may or may not be stored within the same physical housing. For example, any one of the memories may be a hard drive or other storage media located in a server farm of a data center. Accordingly, references to a processor, computer, or memory will be understood to include references to a collection of processors, computers, or memories that may or may not operate in parallel.

Computer 102 may be configured as a database server. In this regard, computer 102 may be capable of communicating data with a client computer such that computer 102 uses a network to transmit information for presentation to a user of a remote computer. Accordingly, computer 102 may be used to obtain information from database 120 for display via, for example, a web browser executing on a remote computer. Computer 102 may also comprise a plurality of computers, such as a load balancing network, that exchange information with different computers of a network for the purpose of receiving, processing, and transmitting data to multiple client computers. In this instance, the client computers will typically still be at different nodes of the network than any of the computers comprising computer 102.

Code generator 114 and any computer code produced therefrom may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. Furthermore, it is understood that code generator 114 may be implemented in the form of hardware, software, or a combination of hardware and software and that the examples herein are merely illustrative. DBM instructions 118 may configure processor 110 to generate database query responses, to update the database, to provide database usage statistics, or to serve any other database related function.

Code generator 114 may contain instructions therein that configure processor 110 to implement the code generation techniques disclosed herein. One example of such instructions may be nesting level adjuster 116, which may be a module that permits users to determine varying degrees of nesting in the final computer code. Code generator 114 may be realized in any non-transitory computer-readable media for use by or in connection with an instruction execution system such as a computer 102, an ASIC or other system that can fetch or obtain the logic from non-transitory computer-readable media and execute the instructions contained therein. "Non-transitory computer-readable media" can be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Figure 3:
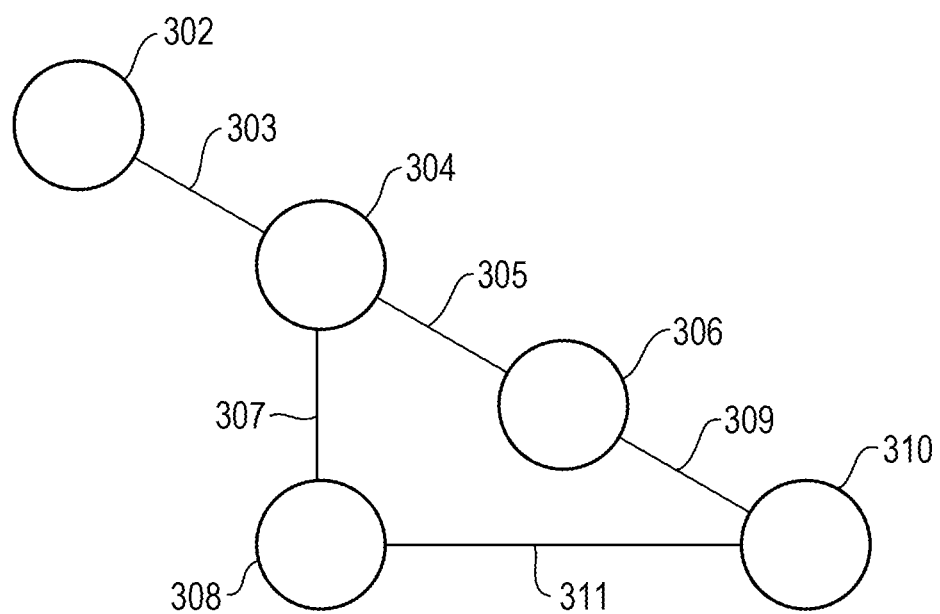
FIG. 3 is an example of a graph.
Figure 4:
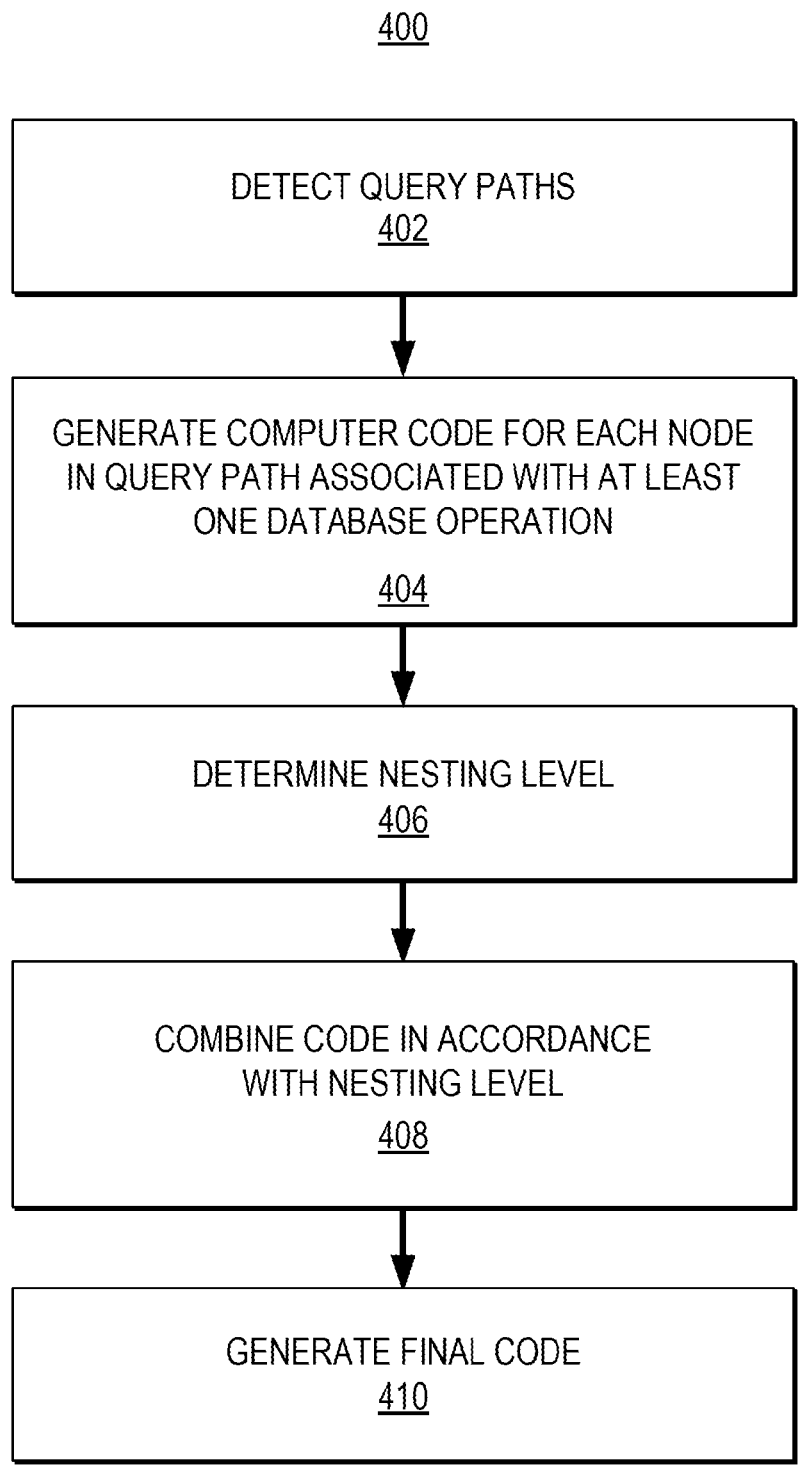
FIG. 4 is a flow diagram of a further illustrative method in accordance with aspects of the disclosure herein.

One working example of a system and method to generate computer code that obtains data with varying degrees of nesting is shown in FIGS. 2-4. In particular, FIGS. 2 and 4 are flow diagrams of illustrative processes for generating computer code in accordance with aspects of the present disclosure. FIG. 3 shows various aspects of computer code generation in accordance with the techniques disclosed herein. The actions shown in FIG. 3 will be discussed below with regard to the flow diagrams of FIGS. 2 and 4.

As shown in block 202 of FIG. 2, a graph comprising a plurality of nodes and at least one edge may be accessed. FIG. 3 shows an example of a graph that may be used to generate computer code that obtains data. Such a graph may be stored as objects or data structures in memory 112. The illustrative graph of FIG. 3 shows a plurality of nodes 302, 304, 306, 308, and 310 and edges 303, 305, 307, 309, and 311. Each edge may associate two of the plurality of nodes. Some of the nodes may be associated with at least one database operation while other nodes may be associated with data. Graph 300 may be the input to code generator 114. Code generator 114 may process each node in graph 300 to determine whether a node is associated with at least one database operation. In one example, if it is determined that a node is associated with at least one data operation, code generator 114 may obtain a computer code template associated with each data operation.

Referring back to FIG. 2, the nesting level may be determined as shown in block 204. The nesting level may be adjustable and may be set by a user. The nesting level may specify a degree of temporary storage to be allocated for intermediate output produced by database operations associated with some of the plurality of nodes. In one example, if the nesting level is a maximum nesting level, the computer code may be constructed such that most of the intermediate output thereof is produced using nested queries therein. In another example, if the nesting level equals a minimum nesting level, the computer code may be constructed such that the intermediate output thereof is stored in a temporary storage area. In a further example, if the nesting level equals a moderate nesting level, the computer code may be constructed such that some intermediate output thereof is produced using nested queries therein.

In block 206 of FIG. 2, computer code may be constructed in accordance with the nesting level. Such computer code may be in any computer language, such as SQL, C++, etc. Referring back to FIG. 3, as noted above, each node shown in graph 300 may be associated with a database operation or with data. The computer code constructed by code generator 114 may correspond to the graph such that the computer code comprises the database operations and uses the data associated with the nodes of the graph. Despite the nesting level, nodes associated with data may result in the production of code that creates a temporary storage area for the associated data and a subsequent query may be generated to retrieve the data therefrom. Such code may include structure definitions of the temporary data, such as data description language ("DDL").

FIG. 4 shows a more detailed flow diagram of an illustrative method of code generation in accordance with the present disclosure. As shown in block 402, a query path may be detected in the graph. A query path may be a plurality of interdependent nodes such that output associated with a first node in the plurality of interdependent nodes is input for a second node therein. A query path may include a breaking point node. A breaking point node may be a node that receives input from more than one node or that transfers output to more than one node. Referring back to FIG. 3, node 304 is one example of a breaking point node, since it transfers output to two nodes, node 306 and node 308. Furthermore, node 310 may also be deemed a breaking point node, since it receives input from more than one node, again node 306 and node 308. As such, FIG. 3 illustrates two query paths. One query path includes nodes 302, 304, 306, and 310. The second query path includes 302, 304, 308, and 310. Referring back to FIG. 4, computer code may be generated for each node in the query path associated with at least one database operation, as shown in block 404. The at least one database operation may be further associated with a template of computer code, such as an SQL template, a C++ template, etc. The templates may comprise temporary parameters. Each node associated with a database operation may also be associated with permanent parameters to replace the temporary parameters in the template.

Referring back to FIG. 4, a nesting level may be determined, as shown in block 406, and the intermediate computer code generated for each node associated with a database operation may be combined to construct the final computer code, in accordance with the nesting level, as shown in block 408. As noted above, if the nesting level is a maximum nesting level, the computer code may be constructed such that the intermediate output thereof is produced using nested queries therein. Thus, when the nesting level is set to the maximum level, the intermediate computer code generated for each node in the graph associated with at least one database operation may be combined to construct the final computer code. If the nesting level equals a minimum nesting level, the code generated for each breaking point node may be adjusted such that the output thereof is stored in a temporary table. However, if the nesting level equals a moderate nesting level, temporary tables may be created for some breaking point nodes. Any subset of breaking point nodes may be selected. In one example, temporary tables are created only for breaking point nodes having multiple outputs.

By way of example, the following SQL code templates may be associated with nodes 304, 306, and 310 of FIG. 3:
304: create table 304;
306: select * from ### 304 ###;
310: select * from ### 306 ###;

Since, nodes 304, 306, and 310 are inter-dependent, the output associated with each node is the input to the node subsequent to each node. If the nesting level is set to a maximum nesting level, the resulting code for node 306 may be the following:
select * from (select * from 304) as N2;

In the above query, the temporary parameter ### 304 ### is replaced with the nested query (select * from 304). However, if the nesting level is set to the minimum level and node 306 is a breaking point node, the produced code may be the following:
create temp table 306 as select * from 304;

The above query creates a temporary table for the data produced by node 304. Then, the code generated for node 306 may retrieve the data from this table with the following code:
306: select * from 304

Referring back to FIG. 4, in block 410, the computer code may be finalized. In one example, the finalization may include a topological sort of the nodes such that the code produced for the interdependent nodes are ordered by dependency. For example, code for a node dependent on output from a previous node should be generated after that of the previous node.

Advantageously, the above-described system and method allow users to adapt code that obtains data to the needs of their particular environment even as the needs change overtime. In this regard, users have more control of code design without having to manually construct the code. Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently, and steps may be added or omitted.

The invention claimed is:

1. A system comprising:
a processor configured to:
access a graph comprising a plurality of nodes and at least one edge, each edge associating two of the plurality of nodes, at least some of the plurality of nodes being associated with at least one database operation;
determine a nesting level associated with the graph, wherein the nesting level is a setting to specify a degree of temporary storage to be allocated for intermediate output produced by the at least one database operation;
detect a query path in the graph, the query path including at least a first node and a second node of the plurality of interdependent nodes, wherein an output of the first node is an input for the second node;
determine, based on the nesting level, whether the intermediate output produced by the at least one database operation should be produced using a nested query in the computer code or should be stored in a temporary storage area and retrieved therefrom; and
construct computer code corresponding to the graph in accordance with the nesting level.

2. The system of claim 1, wherein if the nesting level equals a maximum nesting level, the processor is to construct the computer code such that the intermediate output is produced using nested queries.

3. The system of claim 1, wherein if the nesting level equals a minimum nesting level, the processor is to construct the computer code such that the intermediate output is stored in a temporary storage area.

4. The system of claim 1 wherein if the nesting level equals a moderate nesting level, the processor is to construct the computer code such that a first portion of the intermediate output is produced using nested queries, and a second portion of the intermediate output is stored in a temporary storage area.

5. The system of claim 1, wherein the nesting level is adjustable by a user.

6. A non-transitory computer readable medium having instructions stored therein, which if executed, cause a processor to:
access a graph comprising a plurality of interlinked nodes, wherein at least some of the plurality of interlinked nodes are associated with at least one database operation, wherein each database operation is associated with at least one computer code template;

determine a nesting level associated with the graph, wherein the nesting level is a setting to specify a degree of temporary storage to be allocated for intermediate output produced by the at least one database operation; and construct, based on the nesting level, computer code using the at least one computer code template associated with each database operation, and wherein if the nesting level equals a maximum nesting level, then construct the computer code such that the intermediate output is produced using nested queries.

7. The non-transitory computer readable medium of claim 6, wherein if the nesting level equals a minimum nesting level, the instructions stored in the non-transitory computer readable medium cause the processor to construct the computer code such that the intermediate output is stored in a temporary storage area.

8. The non-transitory computer readable medium of claim 6, wherein if the nesting level equals a moderate nesting level, the instructions stored in the non-transitory computer readable medium cause the processor to construct the computer code such that a first portion of the intermediate output is produced using nested queries, and a second portion of the intermediate output is stored in a temporary storage area.

9. The non-transitory computer readable medium of claim 6, wherein the computer code is structured query language and the computer code template is a structured query language template.

10. The non-transitory computer readable medium of claim 6, wherein the nesting level is adjustable by a user.

11. A method comprising:

accessing, using a processor, a graph comprising a plurality of nodes and at least one edge, each edge associating two of the plurality of nodes, at least some of the plurality of nodes being associated with at least one database operation;

determining, using the processor, a nesting level associated with the graph, wherein the nesting level is a setting to specify a degree of temporary storage to be allocated for intermediate output produced by the at least one database operation; and constructing, using the processor, computer code corresponding to the graph in accordance with the nesting level, and wherein if the nesting level equals a maximum nesting level, then constructing the computer code such that the intermediate output is produced using nested queries.

12. The method of claim 11, wherein if the nesting level equals a minimum nesting level, the computer code is constructed such that the intermediate output is stored in a temporary storage area.

13. The method of claim 11, wherein if the nesting level equals a moderate nesting level, the computer code is constructed such that a first portion of the intermediate output is produced using nested queries, and a second portion of the intermediate output is stored in a temporary storage area.

14. The method of claim 11 further comprising, detecting, using the processor, a query path in the graph, the query path including at least a first node and a second node of the plurality of interdependent nodes, wherein an output of the first node is an input for the second node.

15. The method of claim 14 further comprising, determining, using the processor, whether the intermediate output produced by the at least one database operation should be produced using a nested query in the computer code or should be stored in a temporary storage area and retrieved therefrom in view of the nesting level.

16. The method of claim 11, wherein if the nesting level equals a moderate nesting level, the computer code is constructed such that temporary tables are created only for breaking point nodes having multiple outputs.

* * * * *